United States Patent
Dudar

(10) Patent No.: US 10,378,485 B2
(45) Date of Patent: Aug. 13, 2019

(54) SYSTEMS AND METHODS FOR PREHEATING A FUEL VAPOR STORAGE CANISTER

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/681,098

(22) Filed: Aug. 18, 2017

(65) Prior Publication Data

US 2019/0055905 A1    Feb. 21, 2019

(51) Int. Cl.
| F02D 41/00 | (2006.01) |
| F02M 25/08 | (2006.01) |
| F02D 41/26 | (2006.01) |
| F02D 41/04 | (2006.01) |
| G01C 21/34 | (2006.01) |
| F02D 41/06 | (2006.01) |

(52) U.S. Cl.
CPC ....... *F02M 25/0818* (2013.01); *F02D 41/003* (2013.01); *F02D 41/004* (2013.01); *F02D 41/042* (2013.01); *F02D 41/26* (2013.01); *F02D 41/062* (2013.01); *F02D 2200/701* (2013.01); *F02M 25/089* (2013.01); *F02M 2025/0881* (2013.01); *G01C 21/3484* (2013.01)

(58) Field of Classification Search
CPC ............. F02M 25/0818; F02M 25/089; F02M 2025/0881; F02D 41/004; F02D 41/26; G01C 21/3484; Y02T 10/48; Y02T 10/6286

See application file for complete search history.

(56) References Cited

U.S. PATENT DOCUMENTS

| 6,396,395 B1 | 5/2002 | Zielinski et al. |
| 6,695,895 B2 * | 2/2004 | Hyodo ................. F02M 25/089 123/519 |
| 8,401,733 B2 | 3/2013 | Weslati et al. |
| 9,512,791 B1 | 12/2016 | Dudar et al. |
| 2009/0084363 A1 | 4/2009 | Reddy |
| 2010/0094493 A1* | 4/2010 | Atsumi ................. B60W 20/15 701/22 |

(Continued)

FOREIGN PATENT DOCUMENTS

| CN | 104251703 A | 12/2014 |
| WO | 2014051755 A1 | 4/2014 |

*Primary Examiner* — Hai H Huynh
*Assistant Examiner* — Gonzalo Laguarda
(74) *Attorney, Agent, or Firm* — Julia Voutyras; McCoy Russell LLP

(57) ABSTRACT

Methods and systems are provided for preheating a fuel vapor storage canister in an evaporative emissions system prior to a vehicle start. In one example, a method may include learning common vehicle routes and identifying routes in which fuel vapor storage canister preheating is indicated, such as routes that will enable fuel vapors to be purged to an engine intake shortly after the vehicle start. Then, in anticipation of an identified route for fuel vapor storage canister preheating, a vehicle controller may be transitioned from a sleep mode to an awake mode prior to the vehicle start in order to commence a fuel vapor storage canister preheating routine.

19 Claims, 5 Drawing Sheets

(56) References Cited

U.S. PATENT DOCUMENTS

| | | | |
|---|---|---|---|
| 2010/0252006 A1* | 10/2010 | Reddy | B60K 15/03504 |
| | | | 123/519 |
| 2012/0312281 A1* | 12/2012 | Tsutsumi | F02M 25/089 |
| | | | 123/519 |
| 2015/0090232 A1 | 4/2015 | Peters et al. | |
| 2015/0120110 A1* | 4/2015 | Yang | B60K 6/20 |
| | | | 701/22 |
| 2015/0219045 A1* | 8/2015 | Aso | F02M 37/0082 |
| | | | 123/495 |
| 2016/0138528 A1 | 5/2016 | Burleigh et al. | |
| 2017/0008375 A1 | 1/2017 | Blatchley et al. | |
| 2017/0114732 A1* | 4/2017 | Dudar | F02M 25/0809 |

\* cited by examiner

SYSTEMS AND METHODS FOR PREHEATING A FUEL VAPOR STORAGE CANISTER

FIELD

The present description relates generally to methods and systems for preheating a fuel vapor storage canister in an evaporative emissions system of a vehicle.

BACKGROUND/SUMMARY

Vehicle emission control systems may be configured to store fuel vapors from fuel tank refueling, diurnal emissions, and running loss vapors and then purge the stored vapors during a subsequent engine operation. Specifically, the fuel vapors are stored in a fuel vapor storage canister packed with an adsorbent (e.g., activated carbon) that adsorbs and stores the vapors until they are routed to an engine intake manifold for use as fuel. The fuel vapors may be comprised of vaporized hydrocarbons having a range of carbon chain lengths. The ability of the fuel vapor storage canister to adsorb fuel vapors is enhanced at cooler temperatures, and the ability of the fuel vapor storage canister to desorb fuel vapors is enhanced at hotter temperatures. Lower molecular weight hydrocarbons (also referred to herein as "light ends"), such as one-carbon methane to four-carbon butane, may easily desorb during purging as fresh air is flowed through the fuel vapor storage canister. However, higher molecular weight hydrocarbons (also referred to herein as "heavy ends"), such as seven-carbon heptane and above, resist movement during purging without heat to energize them to desorb from the adsorbent. As a result, fuel vapor storage canister cleaning may be incomplete during purging due to trapped heavy ends if heat is not applied. Incomplete fuel vapor storage canister cleaning may lead to greater bleed emissions. For example, when the vehicle soaks in the sun, the fuel vapor storage canister may heat up enough for the heavy ends to desorb and escape to the atmosphere.

Furthermore, in stop/start vehicles in which the engine is shutdown while the vehicle remains on, such as when the vehicle is stopped, frequent engine shutdowns may reduce opportunities to purge the fuel vapor storage canister. Reduced opportunities for purging may lead to a high vapor load on the fuel vapor storage canister, increasing bleed emissions. Therefore, it may be beneficial to quickly purge both light and heavy ends as soon as possible to ensure that the fuel vapor storage canister is effectively cleaned.

Other attempts to reduce bleed emissions by effectively purging hydrocarbon heavy ends include using heated fuel vapor storage canisters. One example approach is shown by Peters et al. in U.S. 20150090232 A1. Therein, a method is disclosed for adjusting a heater of a fuel vapor storage canister based on a rate of purge flow exiting the fuel vapor storage canister and a concentration of hydrocarbons released from the fuel vapor storage canister. Furthermore, to counteract relative low temperatures reached by the fuel vapor storage canister during engine-off periods (e.g., when the engine is not rotating and not combusting air and fuel) in a hybrid vehicle, where heating the fuel vapor storage canister during purge may result in ineffective purging, the heater of the fuel vapor storage canister may be maintained at a temperature that is lower than that desired for purge but higher than ambient temperature.

However, the inventor herein has recognized that maintaining the fuel vapor storage canister heater on, even at a low level, consumes energy. As one example, it is unknown when or if the engine will turn back on during the drive cycle for purging to occur. Therefore, the fuel vapor storage canister may be heated unnecessarily, which may waste energy.

In one example, the issues described above may be addressed by an evaporative emissions method, comprising: while a vehicle remains off, preheating a fuel vapor storage canister in an evaporative emissions system of the vehicle to a desired temperature at a determined duration prior to commencing a drive cycle; and purging vapors stored in the fuel vapor storage canister to an intake of an engine of the vehicle after the commencement of the drive cycle. In this way, cleaning of the fuel vapor storage canister may be expedited.

As one example, the drive cycle may be a learned drive cycle that that enables the purging to occur within a threshold duration after the commencement of the drive cycle. For example, the purging may be enabled if engine is operated above idle speed and with vacuum in the intake above a threshold vacuum. Further, prior to the commencement of the drive cycle and while the fuel vapor storage canister is preheated, an evaporative emissions system test may be performed to determine if the evaporative emissions system is degraded or not. For example, if the pressure of the evaporative emissions system does not reach a threshold pressure, the evaporative emissions system may be determined to be degraded. By heating the fuel vapor storage canister only when conditions for purging the fuel vapor canister are anticipated to be met, energy may be conserved. Further, by performing the evaporative emissions system test while the fuel vapor storage canister is preheated, even if purging does not occur, the energy spent preheating the fuel vapor storage canister may be utilized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
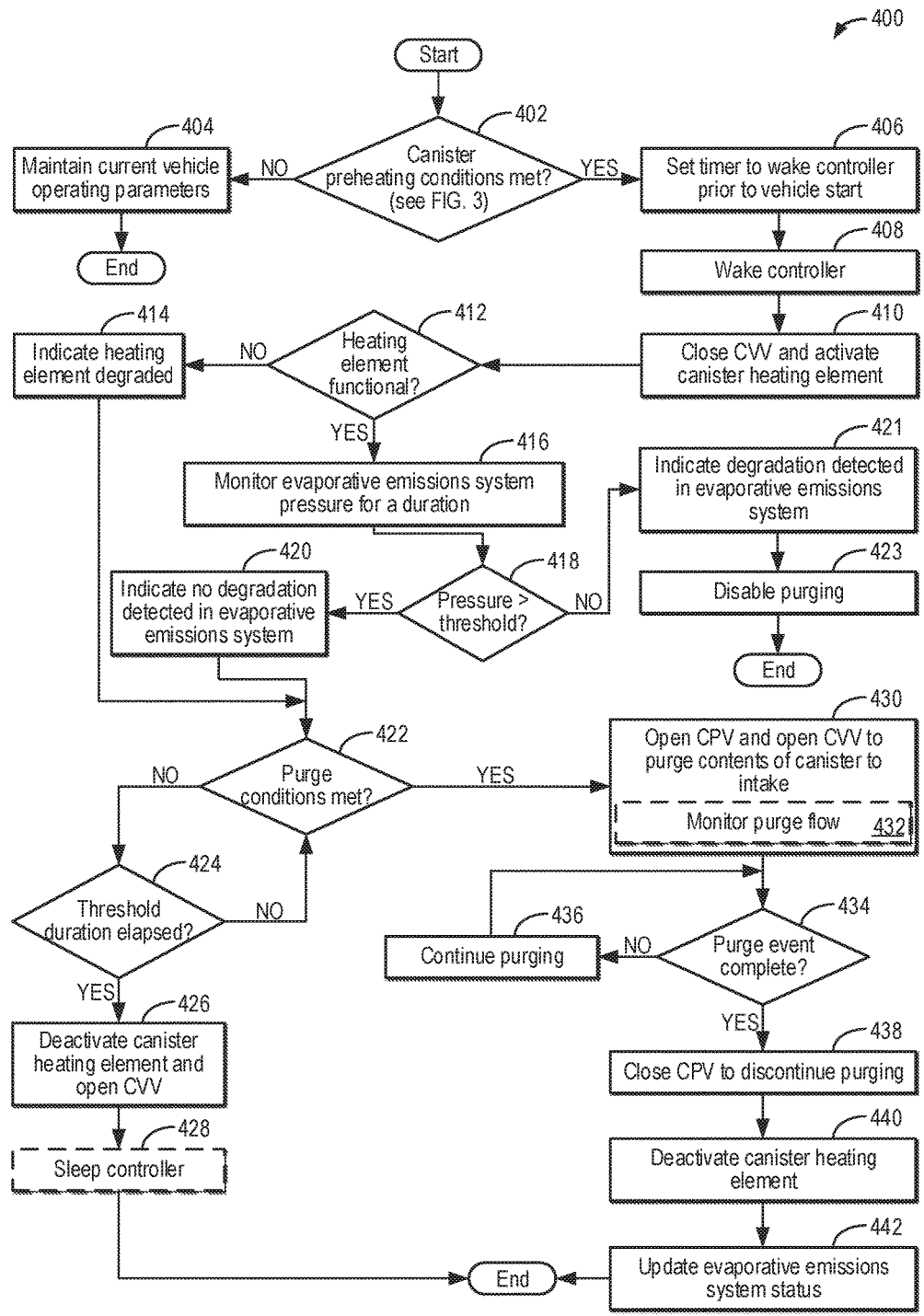
FIG. 4 is a flow chart of an example method for preheating a fuel vapor storage canister in an evaporative emissions system of a vehicle while the vehicle is off based on a predicted drive cycle.
Figure 5:
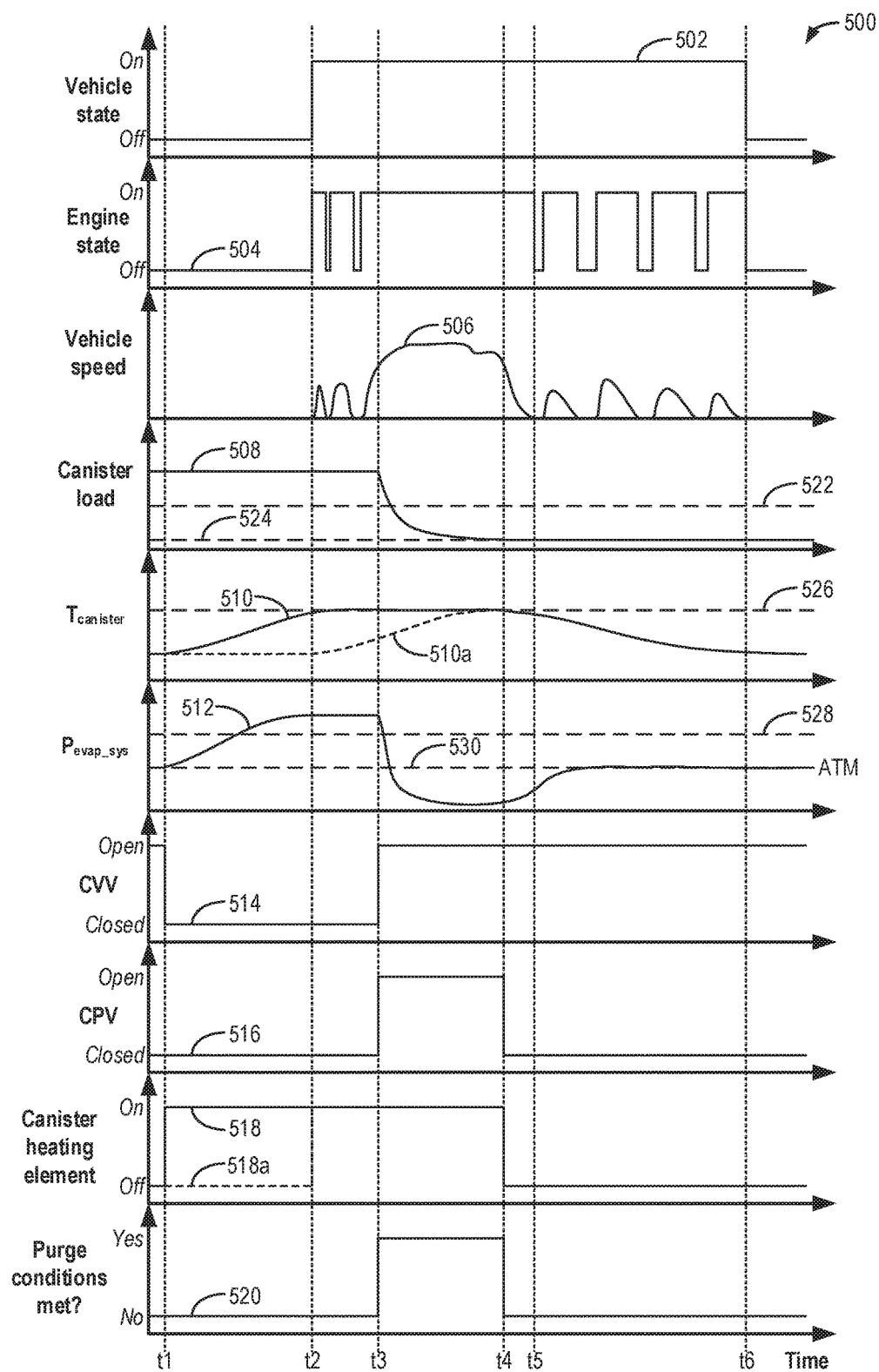
FIG. 5 shows an example timeline for preheating a fuel vapor storage canister in anticipation of a drive cycle that enables purging.

The following description relates to systems and methods for purging a fuel vapor storage canister in a vehicle evaporative emissions system, where the fuel vapor storage canister is thoroughly purged of both hydrocarbon light ends and hydrocarbon heavy ends by preheating the fuel vapor storage canister prior to vehicle start. The systems and methods may be applied to a stop/start vehicle or a hybrid vehicle, such as the hybrid vehicle depicted in FIG. 1, although it may be understood that the systems and methods depicted herein are not limited to such vehicle systems. For example, the systems and methods may be applied to any vehicle comprising an evaporative emission system coupled to a fuel system and an engine, such as the vehicle system depicted in FIG. 2. The fuel vapor storage canister may be preheated while the vehicle is off in anticipation of an upcoming driving route that will enable a purging event to occur. Such driving routes may be learned according to the example method of FIG. 3. An example method for preheating the fuel vapor storage canister while simultaneously diagnosing whether there is degradation in the evaporative emissions system and then thoroughly purging both hydrocarbon light ends and hydrocarbon heavy ends is depicted in FIG. 4. An example timeline for preheating the fuel vapor storage canister based on the predicted driving route to expedite thorough fuel vapor storage canister cleaning is illustrated in FIG. 5.

Figure 1:
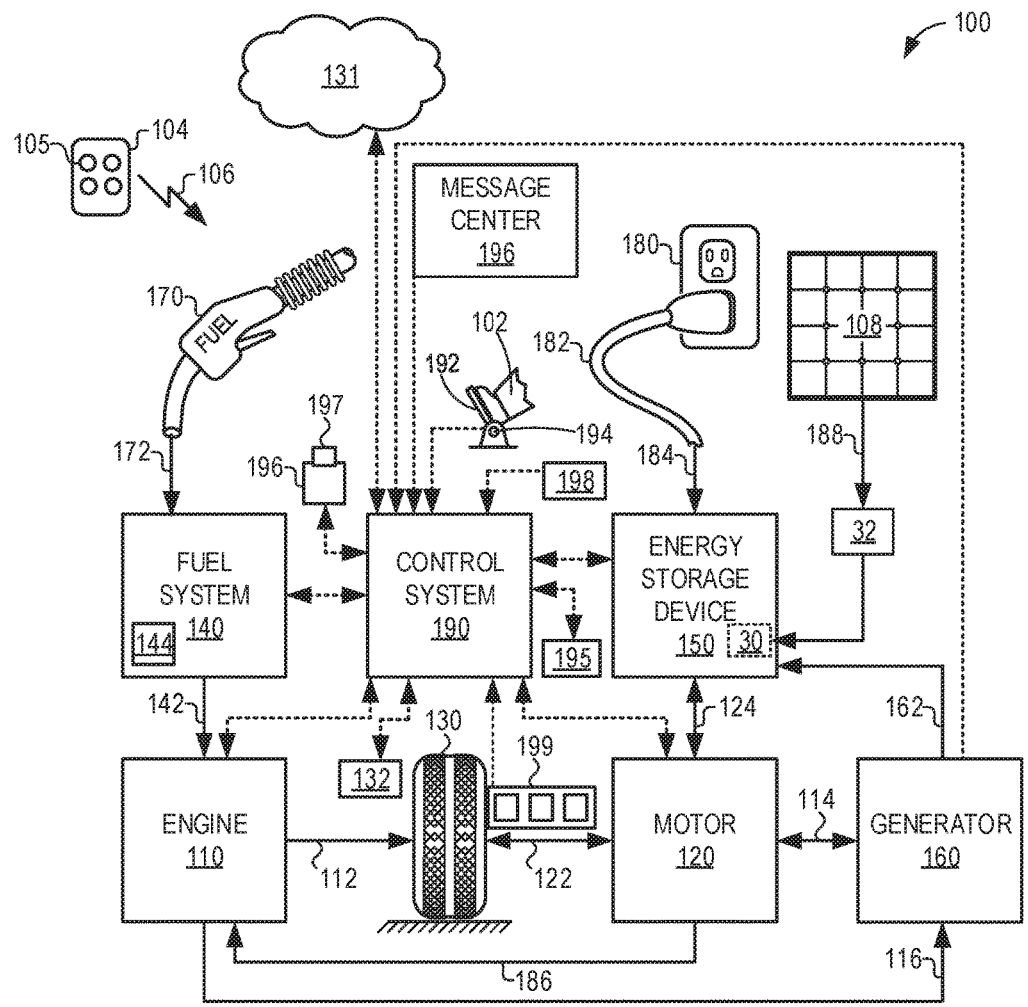
FIG. 1 schematically shows an example vehicle propulsion system.

FIG. 1 illustrates an example vehicle system 100. Vehicle system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via a drive wheel 130, as indicated by an arrow 122, while engine 110 is deactivated.

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 160 may instead receive wheel torque from drive wheel 130 and may convert the kinetic energy of the vehicle to electrical energy for storage at energy storage device 150, as indicated by an arrow 162. As an additional example, motor 120 may use energy stored at energy storage device 150 to crank engine 110 in a starting operation, as indicated by an arrow 186.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 160, as indicated by an arrow 116, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel storage tanks 144 for storing fuel on-board the vehicle. For example, fuel tank 144 may store one or more liquid fuels, including (but not limited to) gasoline, diesel, and alcohol fuels. In some examples, the fuel may be stored on-board the vehicle as a blend of two or more different fuels. For example, fuel tank 144 may be configured to store a blend of gasoline and ethanol (such as E10, E85, etc.) or a blend of gasoline and methanol (such as M10, M85, etc.), whereby these fuels or fuel blends may be delivered to engine 110 as indicated by arrow 142. Still other suitable fuels or fuel blends may be supplied to engine 110, where they may be combusted to produce an engine output (e.g., torque). The engine output may be utilized to propel the vehicle (as indicated by arrow 112) or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

A control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback.

Control system 190 may receive an indication of an operator requested output of the vehicle propulsion system from a vehicle operator 102. For example, control system 190 may receive sensory feedback from a pedal position sensor 194 concerning a position of a pedal 192. Pedal 192 may refer schematically to a brake pedal and/or an accelerator pedal that may be depressed by vehicle operator 102. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or a smartphone-based system where a user's telephone sends data to a server and the server communicates with the vehicle to start the engine.

Energy storage device 150 may periodically receive electrical energy from a power source 180 residing external to the vehicle (e.g., an external stationary power grid that is not part of the vehicle), as indicated by an arrow 184. As a non-limiting example, vehicle system 100 may be configured as a plug-in HEV, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

In still other examples, vehicle system 100 may include one or more solar cells 108, operative to convert incident solar radiation into electrical energy. The solar cells 108 are electrically coupled to a solar battery 30 via a charge controller 32. Solar cells 108 and charge controller 32 are operative to supply electrical current for charging solar battery 30. In this example, solar battery 30 is housed within and electrically coupled to energy storage device 150, but in other configurations, solar battery 30 may be electrically coupled to energy storage device 150 while being housed separately. In still other configurations, solar battery 30 may be both physically and electrically isolated from energy storage device 150. Solar battery 30 may thus be configured to provide or receive charge from energy storage device 150, depending on engine operating conditions, charge status, and battery requirement(s). Solar battery 30 may be configured to independently supply charge directly to vehicle actuators and devices, as will be described further herein with regard to FIG. 4. In some examples, charge controller 32 may be used to directly supply power to vehicle actuators and devices without requiring charge to first be stored in solar battery 30.

Solar cells 108 may be mounted on any convenient exterior surface of the vehicle, for example, a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some embodiments, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 32 and solar battery 30. In this way, solar cells 108 may generate electrical energy with which to propel the vehicle or power one or more additional vehicle actuators and devices.

Fuel system 140 may periodically receive fuel from a fuel source residing external to the vehicle. As a non-limiting example, vehicle system 100 may be refueled by receiving fuel via a fuel dispensing device 170, as indicated by an arrow 172. In some examples, fuel tank 144 may be configured to store the fuel received from fuel dispensing device 170 until it is supplied to engine 110 for combustion. In some examples, control system 190 may receive an indication of the level of fuel stored in fuel tank 144 via a fuel level sensor. The level of fuel stored in fuel tank 144 (e.g., as identified by the fuel level sensor) may be communicated to the vehicle operator, for example, via a fuel gauge or indication in a vehicle instrument panel (e.g., message center) 196.

The vehicle system 100 may also include an ambient temperature/humidity sensor 198 and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input devices for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle (e.g., fuel tank 144) may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g. WiMax) may be used in place of or in conjunction with V2V or V2I2V to extend the coverage area by a few miles. In still other examples, vehicle control system 190 may be communicatively coupled to other vehicles or infrastructures via wireless network 131 and the internet (e.g. the cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be additionally used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

Figure 2:
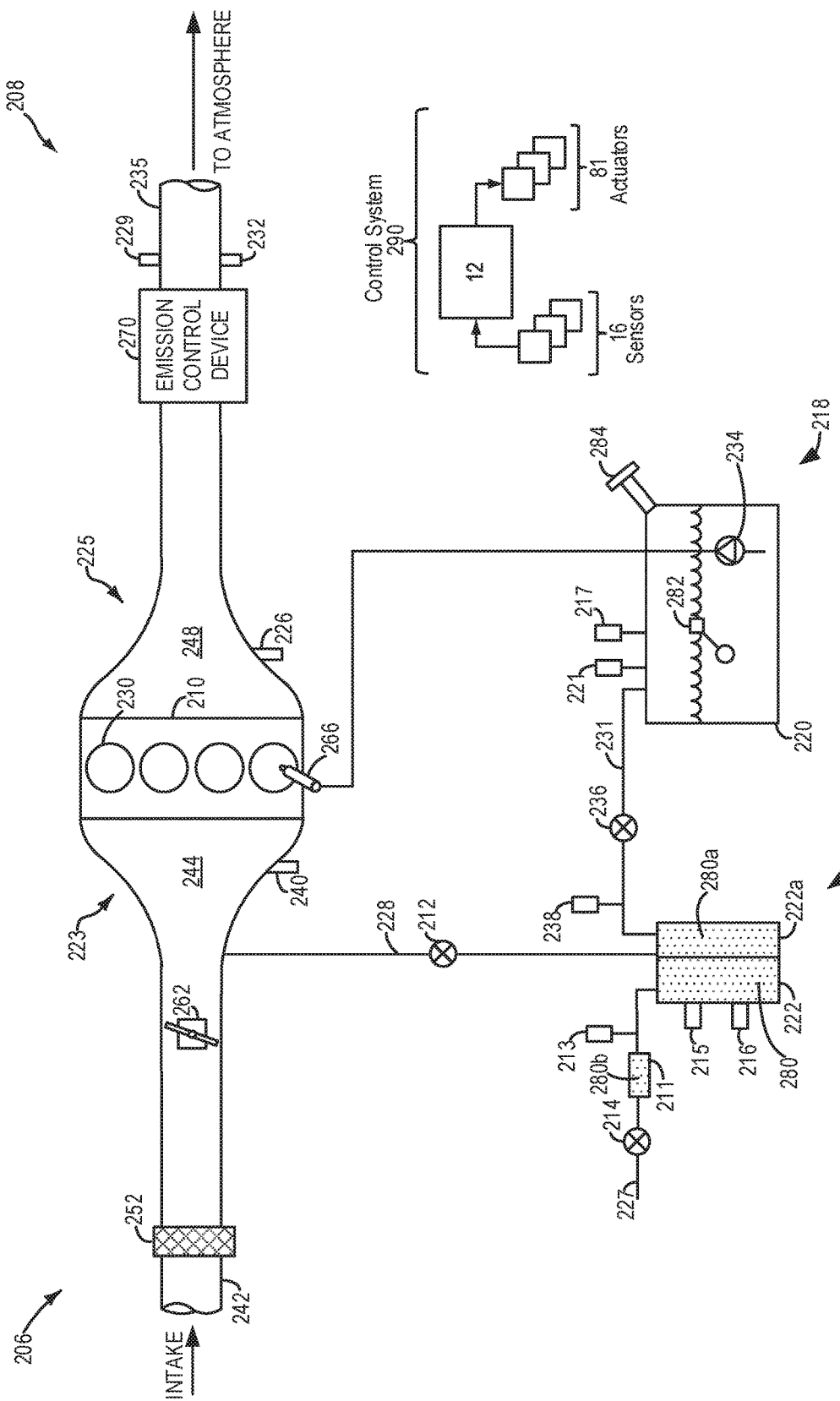
FIG. 2 shows a schematic depiction of a fuel system and evaporative emission system coupled to an engine system.

FIG. 2 shows a schematic depiction of a vehicle system 206. It may be understood that vehicle system 206 may comprise the same vehicle system as vehicle system 100 depicted in FIG. 1. Vehicle system 206 may derive propulsion power from engine system 208 and/or an on-board energy storage device (such as energy storage device 150 shown in FIG. 1). An energy conversion device, such as a generator (e.g., generator 160 of FIG. 1), may be operated to absorb energy from vehicle motion and/or engine operation and convert the absorbed energy to an energy form suitable for storage by the energy storage device.

Engine system 208 may include an engine 210 having a plurality of cylinders 230. Engine 210 may be engine 110 shown in FIG. 1, for example. Engine 210 may include an engine intake system 223 and an engine exhaust system 225. Engine intake system 223 may include an air intake throttle 262 fluidly coupled to an engine intake manifold 244 via an intake passage 242. Air may be routed to intake throttle 262 after passing through an air filter 252 coupled to intake passage 242 upstream of intake throttle 262. Engine exhaust system 225 includes an exhaust manifold 248 leading to an exhaust passage 235 that routes exhaust gas to the atmosphere. Engine exhaust system 225 may include one or more emission control devices 270 mounted in a close-coupled position. The one or more emission control devices may include a three-way catalyst, a lean NOx trap, a particulate filter (e.g., a diesel particulate filter or a gasoline particulate filter), an oxidation catalyst, etc. It will be appreciated that other components may be included in the engine such as a variety of valves and sensors, as further elaborated in herein. In some embodiments, wherein engine system 208 is a boosted engine system, the engine system may further include a boosting device, such as a turbocharger (not shown).

Engine system 208 is coupled to a fuel system 218 and an evaporative emissions system 219. Fuel system 218 includes a fuel tank 220 coupled to a fuel pump 234, the fuel tank supplying a fuel to engine 210 that propels vehicle system 206. Evaporative emissions system 219 includes a fuel vapor storage canister 222. During a fuel tank refueling event, fuel may be pumped into the vehicle from an external source through a refueling port 284. Fuel tank 220 may hold a plurality of fuel blends, including fuel with a range of alcohol concentrations, such as various gasoline-ethanol blends, including E10, E85, gasoline, etc., and combinations thereof. A fuel level sensor 282 located in fuel tank 220 may provide an indication of a fuel level ("Fuel Level Input") to a controller 12 of a control system 290 (which may be control system 190 of FIG. 1, for example). As depicted, fuel level sensor 282 may comprise a float connected to a variable resistor. Alternatively, other types of fuel level sensors may be used.

Fuel pump 234 is configured to deliver pressurized fuel to fuel injectors of engine 210, such as an example fuel injector 266. While only a single fuel injector 266 is shown, additional fuel injectors may be provided for each cylinder. It will be appreciated that fuel system 218 may be a return-less fuel system, a return fuel system, or various other types of fuel system. Vapors generated in fuel tank 220 may be routed to fuel vapor storage canister 222 via a conduit 231 for storage before being purged to the engine intake system 223.

Fuel vapor storage canister 222 is filled with an appropriate adsorbent 280 for temporarily trapping fuel vapors (including vaporized hydrocarbons) generated during fuel tank refueling operations, diurnal vapors, and running-loss vapors. In one example, adsorbent 280 is activated charcoal (e.g., carbon). While a single fuel vapor storage canister 222 is shown, it will be appreciated that fuel system 218 and evaporative emissions system 219 may include any number of fuel vapor storage canisters. When purging conditions are met, such as when the fuel vapor storage canister is saturated, vapors stored in fuel vapor storage canister 222 may be purged to engine intake system 223 by opening a canister purge valve (CPV) 212, which may be a normally closed valve. In one example, canister purge valve 212 may be a solenoid valve wherein opening or closing of the valve is performed via actuation of a canister purge solenoid.

Fuel vapor storage canister 222 may include a buffer 222a (or buffer region), each of the fuel vapor storage canister and the buffer comprising adsorbent. For example, buffer 222a is shown packed with an adsorbent 280a. As shown, the volume of buffer 222a may be smaller than (e.g., a fraction of) the volume of fuel vapor storage canister 222. Adsorbent 280a in the buffer 222a may be same as or different from adsorbent 280 in the fuel vapor storage canister (e.g., both may include charcoal). Buffer 222a may be positioned within fuel vapor storage canister 222 such that during fuel vapor storage canister loading, fuel tank vapors are first adsorbed within the buffer, and then when the buffer is saturated, further fuel tank vapors are adsorbed in the fuel vapor storage canister. In comparison, during fuel vapor storage canister purging, fuel vapors are first desorbed from the fuel vapor storage canister (e.g., to a threshold amount) before being desorbed from the buffer. In other words, loading and unloading of the buffer is not linear with the loading and unloading of the fuel vapor storage canister. As such, the effect of the fuel vapor storage canister buffer is to dampen any fuel vapor spikes flowing from the fuel tank to the fuel vapor storage canister, thereby reducing the possibility of any fuel vapor spikes going to the engine.

Fuel vapor storage canister 222 includes a vent 227 for routing gases out of the fuel vapor storage canister 222 to the atmosphere when storing fuel vapors from fuel tank 220. Vent 227 may also allow fresh air to be drawn into fuel vapor storage canister 222 when purging stored fuel vapors to engine intake 223 via a purge line 228 and canister purge valve 212. While this example shows vent 227 communicating with fresh, unheated air, various modifications may also be used. Vent 227 may include a canister vent valve (CVV) 214 to adjust a flow of air and vapors between fuel vapor storage canister 222 and the atmosphere. When included, the vent valve may be a normally open valve so that air, stripped of fuel vapor after having passed through the fuel vapor storage canister, can be pushed out to the atmosphere (for example, during refueling while the engine is off). Likewise, during purging operations (for example, during fuel vapor storage canister regeneration and while the engine is running), the fuel vapor storage canister vent valve may be opened to allow a flow of fresh air to strip the fuel vapors stored in the fuel vapor storage canister. In one example, canister vent valve 214 may be a solenoid valve wherein opening or closing of the valve is performed via actuation of a canister vent solenoid. In particular, the canister vent valve may be in an open position that is closed upon actuation of the canister vent solenoid.

Evaporative emissions system 219 may further include a bleed fuel vapor storage canister 211. Hydrocarbons that desorb from fuel vapor storage canister 222 (hereinafter also referred to as the "main fuel vapor storage canister") may be adsorbed within the bleed fuel vapor storage canister. Bleed fuel vapor storage canister 211 may include an adsorbent material that is different than the adsorbent material included in main fuel vapor storage canister 222. Alternatively, the adsorbent material in bleed fuel vapor storage canister 211 may be the same as that included in main fuel vapor storage canister 222.

A hydrocarbon (HC) sensor 213 may be present in evaporative emissions system 219 to indicate the concentration of hydrocarbons in vent 227. As illustrated, hydrocarbon sensor 213 is positioned between main fuel vapor storage canister 222 and bleed fuel vapor storage canister 211. A probe (e.g., sensing element) of hydrocarbon sensor 213 is exposed to and senses the hydrocarbon concentration of fluid flow in vent 227. Hydrocarbon sensor 213 may be used by the engine control system 290 for determining breakthrough of hydrocarbon vapors from main fuel vapor storage canister 222, in one example.

One or more temperature sensors 215 may be coupled to and/or within fuel vapor storage canister 222. As fuel vapor is adsorbed by the adsorbent in the fuel vapor storage canister, heat is generated (heat of adsorption). Likewise, as fuel vapor is desorbed by the adsorbent in the fuel vapor storage canister, heat is consumed. In this way, the adsorption and desorption of fuel vapor by the fuel vapor storage canister may be monitored and estimated based on temperature changes within the fuel vapor storage canister. Further, one or more canister heating elements 216 may be coupled to and/or within fuel vapor storage canister 222. Canister heating element 216 may be used to selectively heat the fuel vapor storage canister (and the adsorbent contained within) for example, to increase desorption of fuel vapors prior to performing a purge operation. As described above, heating the fuel vapor storage canister may be particularly beneficial for purging hydrocarbon heavy ends. Canister heating element 216 may comprise an electric heating element, such as a conductive metal, ceramic, or carbon element that may be heated electrically. In some embodiments, canister heating element 216 may comprise a source of microwave energy or may comprise a fuel vapor storage canister jacket coupled to a source of hot air or hot water. Canister heating element 216 may be coupled to one or more heat exchangers that may facilitate the transfer of heat, (e.g., from hot exhaust) to fuel vapor storage canister 222. Canister heating element 216 may be configured to heat air within fuel vapor storage canister 222 and/or to directly heat the adsorbent located within fuel vapor storage canister 222. In some embodiments, canister heating element 216 may be included in a heater compartment coupled to the interior or exterior of fuel vapor storage canister 222. In some embodiments, fuel vapor storage canister 222 may be coupled to one or more cooling circuits, and/or cooling fans. In this way, fuel vapor storage canister 222 may be selectively cooled to increase adsorption of fuel vapors (e.g., prior to a refueling event). In some examples, canister heating element 216 may comprise one or more Peltier elements, which may be configured to selectively heat or cool fuel vapor storage canister 222.

Vehicle system 206 may have reduced engine operation times due to the vehicle being powered by engine system 208 during some conditions and by the energy storage device under other conditions (such as when vehicle system 206 is included in a hybrid vehicle) or due to the engine shutting down when the vehicle is on and at rest (such as when vehicle system 206 is included in a stop/start vehicle). While the reduced engine operation times reduce overall carbon emissions from the vehicle, they may also lead to insufficient purging of fuel vapors from evaporative emission system 219. To at least partially address this, a fuel tank isolation valve (FTIV) 236 may be optionally included in conduit 231 such that fuel tank 220 is coupled to fuel vapor storage canister 222 via the valve. During regular engine operation, FTIV 236 may be kept closed to limit the amount of diurnal or "running loss" vapors directed to fuel vapor storage canister 222 from fuel tank 220. During refueling operations and selected purging conditions, FTIV 236 may be temporarily opened, e.g., for a duration, to direct fuel vapors from fuel tank 220 to fuel vapor storage canister 222. By opening the valve during purging conditions or when the fuel tank pressure is higher than a threshold (e.g., above a mechanical pressure limit of the fuel tank), the refueling vapors may be released into the fuel vapor storage canister and the fuel tank pressure may be maintained below pressure limits. While the depicted example shows isolation valve 236 positioned along conduit 231, in alternate embodiments, the isolation valve may be mounted on fuel tank 220.

One or more pressure sensors may be coupled to fuel system 218 and evaporative emissions system 219 for providing an estimate of a fuel system and an evaporative emissions system pressure, respectively. In the example illustrated in FIG. 2, a first pressure sensor 217 is coupled directly to fuel tank 220, and a second pressure sensor 238 is coupled to conduit 231 between FTIV 236 and fuel vapor storage canister 222. For example, first pressure sensor 217 may be a fuel tank pressure transducer (FTPT) coupled to fuel tank 220 for measuring a pressure of fuel system 218, and second pressure sensor 238 may measure a pressure of evaporative emissions system 219. In alternative embodiments, first pressure sensor 217 may be coupled between fuel tank 220 and fuel vapor storage canister 222, specifically between the fuel tank and FTIV 236. In still other embodiments, a single pressure sensor may be included for measuring both the fuel system pressure and the evaporative system pressure, such as when FTIV 236 is open or omitted. In some examples, engine control system 290 may infer and indicate undesired evaporative emissions (e.g., undesired hydrocarbon emissions) based on changes in an evaporative emissions system pressure during an emissions test, as further described below with respect to FIG. 4.

One or more temperature sensors 221 may also be coupled to fuel system 218 for providing an estimate of a fuel system temperature. In one example, the fuel system temperature is a fuel tank temperature, wherein temperature sensor 221 is a fuel tank temperature sensor coupled to fuel tank 220. While the depicted example shows temperature sensor 221 directly coupled to fuel tank 220, in alternate embodiments, the temperature sensor may be coupled between the fuel tank and fuel vapor storage canister 222.

Fuel vapors released from fuel vapor storage canister 222, such as during a purging operation, may be directed into engine intake manifold 244 via purge line 228. The flow of vapors along purge line 228 may be regulated by canister purge valve 212, coupled between the fuel vapor storage canister and the engine intake. The quantity and rate of vapors released by the fuel vapor storage canister purge valve may be determined by the duty cycle of an associated canister purge valve solenoid (not shown). As such, the duty cycle of the canister purge valve solenoid may be determined by controller 12 responsive to engine operating conditions, including, for example, engine speed-load conditions, an air-fuel ratio, a fuel vapor storage canister load, etc. By commanding the canister purge valve to be closed, the controller may seal the fuel vapor recovery system from the engine intake. An optional canister check valve (not shown) may be included in purge line 228 to prevent intake manifold pressure from flowing gases in the opposite direction of the purge flow. As such, the check valve may be beneficial if the canister purge valve control is not accurately timed or the canister purge valve itself can be forced open by a high intake manifold pressure. An estimate of the manifold absolute pressure (MAP) or manifold vacuum (ManVac) may be obtained by controller 12 from a MAP sensor 240 coupled to intake manifold 244. Alternatively, MAP may be inferred from alternate engine operating conditions, such as mass air flow (MAF), as measured by a MAF sensor (not shown) coupled to the intake manifold.

Fuel system 218 and evaporative emissions system 219 may be operated by controller 12 in a plurality of modes by selective adjustment of the various valves and solenoids. For example, the fuel system and evaporative emissions system may be operated in a refueling mode (e.g., when fuel tank refueling is requested by a vehicle operator), wherein the controller 12 may open FTIV 236 and canister vent valve 214 while maintaining canister purge valve 212 closed to depressurize the fuel tank before enabling fuel to be added therein. As such, FTIV 236 may be kept open during the refueling operation to allow refueling vapors to be stored in the fuel vapor storage canister. After refueling is completed, the isolation valve may be closed. By maintaining canister purge valve 212 closed, refueling vapors are directed into fuel vapor storage canister 222 while preventing the fuel vapors from flowing into the intake manifold. As another example, the fuel system and the evaporative emissions system may be operated in a fuel vapor storage canister purging mode (e.g., after an emission control device light-off temperature has been attained and with the engine running), wherein the controller 12 may open canister purge valve 212 and canister vent valve 214 while closing FTIV 236. The vacuum generated by the intake manifold of the engine may be used to draw fresh air through vent 227 and through fuel vapor storage canister 222 to purge the stored fuel vapors into intake manifold 244. In this mode, the purged fuel vapors from the fuel vapor storage canister are combusted in the engine. The purging may be continued until the stored fuel vapor amount in the fuel vapor storage canister is below a threshold.

During purging, the learned vapor amount/concentration may be used to determine the amount of fuel vapors stored in the fuel vapor storage canister, and then during a later portion of the purging operation (when the fuel vapor storage canister is sufficiently purged or empty), the learned vapor amount/concentration may be used to estimate a loading state of the fuel vapor storage canister. For example, one or more oxygen sensors (not shown) may be coupled to the fuel vapor storage canister 222 (e.g., downstream of the fuel vapor storage canister) or positioned in the engine intake and/or engine exhaust to provide an estimate of a fuel vapor storage canister load (that is, an amount of fuel vapors stored in the fuel vapor storage canister). Based on the fuel vapor storage canister load and further based on engine operating conditions, such as engine speed-load conditions, a purge flow rate may be determined.

Vehicle system 206 may further include control system 290. Control system 290 is shown receiving information from a plurality of sensors 16 (various examples of which are described herein) and sending control signals to a plurality of actuators 81 (various examples of which are described herein). As one example, sensors 16 may include an exhaust gas sensor 226 located upstream of emission control device 270, a temperature sensor 232 coupled to exhaust passage 235, MAP sensor 240, FTPT 217, second pressure sensor 238, hydrocarbon sensor 213, temperature sensor 221, and a pressure sensor 229 located downstream of emission control device 270. Other sensors, such as additional pressure, temperature, air/fuel ratio, and composition sensors, may be coupled to various locations in the vehicle system 206. As another example, actuators 81 may include fuel injector 266, FTIV 236, purge valve 212, vent valve 214, fuel pump 234, and throttle 262.

As described above with reference to FIG. 1, control system 290 may further receive information regarding the location of the vehicle from an on-board GPS. Information received from the GPS may include vehicle speed, vehicle altitude, vehicle position, etc. This information may be used to infer engine operating parameters, such as local barometric pressure. Control system 290 may further be configured to receive information via the internet or other communication networks. Information received from the GPS may be cross-referenced to information available via the internet to determine local weather conditions, local vehicle regulations, etc. Control system 290 may use the internet to obtain updated software modules, which may be stored in non-transitory memory.

Controller 12 of control system 290 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may receive input data from the various sensors, process the input data, and trigger the actuators in response to the processed input data based on instruction or code programmed therein corresponding to one or more routines. Example control routines are described herein with regard to FIGS. 3 and 4.

In some examples, the controller may be placed in a reduced power mode or sleep mode, wherein the controller maintains essential functions only and operates with a lower battery consumption than in a corresponding awake mode. For example, the controller may be placed in the sleep mode following a vehicle-off event (e.g., a human driver removing a key from a vehicle and/or leaving the proximity of the vehicle with a key fob, at which time the engine may be stopped rotating and electrical propulsion devices, if present, may be deactivated) in order to perform a diagnostic routine a duration after the vehicle-off event. The controller may have a wake input that allows the controller to be returned to the awake mode based on an input received from one or more sensors. For example, the opening of a vehicle door may trigger a return to an awake mode. In other examples, particularly with regard to the fuel vapor storage canister preheating method depicted in FIG. 4, the controller may need to be awoken in order to execute one or more methods. In such an example, the controller may set a timer following the vehicle-off event before entering the sleep mode such that the controller may be awoken to preheat the fuel vapor storage canister before the vehicle is turned on, as further described below. For example, when the timer elapses, a circuit may wake the controller to commence the fuel vapor storage canister preheating routine.

Controller 12 may also be configured to intermittently perform evaporative emissions system diagnostic routines to determine the presence or absence of undesired evaporative emissions in evaporative emissions system and/or fuel system. As such, various evaporative emissions diagnostic tests may be performed while the engine is off (engine-off evaporative emissions test) or while the engine is running (engine-on evaporative emissions test). As an example, while the engine is off, the evaporative emission system may be sealed and the pressure monitored. The pressure may further increase if evaporative emissions system is heated due to desorption of the fuel vapors desorb from the fuel vapor storage canister. If the pressure rise meets or exceeds a predetermined threshold, it may be indicated that the evaporative emissions system is free from undesired evaporative emissions (e.g., no evaporative emissions system degradation). Alternatively, if the pressure does not reach the threshold, undesired evaporative emissions may be present (e.g., evaporative emissions system degradation may be present). Therefore, preheating of the fuel vapor storage canister for expedited canister cleaning may be leveraged for conducting an emissions test.

Figure 3:
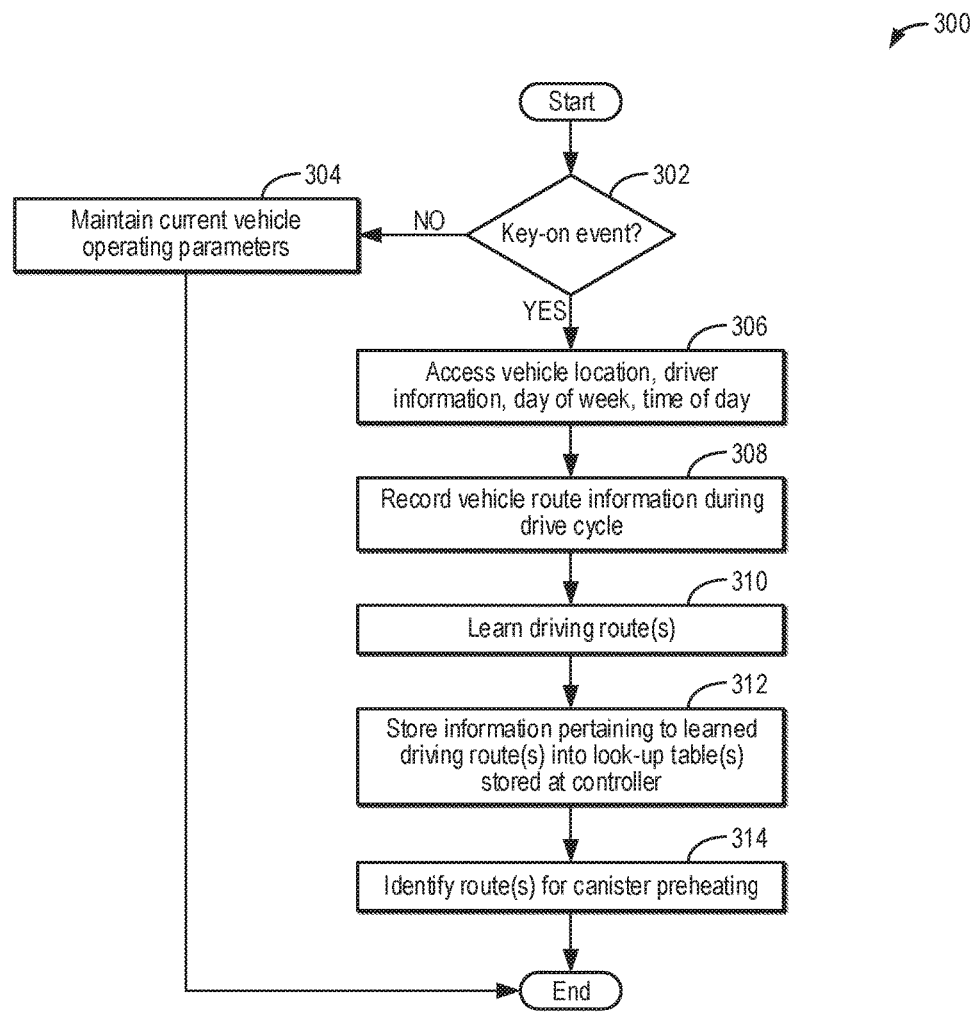
FIG. 3 is a flow chart of an example method for learning driving routes during drive cycles of a vehicle.

Turning now to FIG. 3, a high level example method 300 for learning common driving routes driven in a vehicle is shown. More specifically, method 300 may be utilized to learn common driving routes in order to identify routes for fuel vapor storage canister preheating, such as routes that will enable fuel vapor storage canister purging to occur. For example, routes in which the engine is active for at least a threshold duration may enable fuel vapor storage canister purging, whereas routes in which the engine frequently deactivates may not enable fuel vapor storage canister purging. The timing and durations of learned/predicted engine deactivation events corresponding to a particular driving route may be stored in lookup table(s) stored at a vehicle controller. Such information may be utilized in order to schedule fuel vapor storage canister preheating before the vehicle is turned on, as will be discussed in detail below.

Method 300 will be described with reference to the systems described herein and shown in FIGS. 1-2, although it should be understood that similar methods may be applied to other systems without departing from the scope of this disclosure. Instructions for carrying out method 300 and the rest of the methods included herein may be executed by a controller, such as controller 12 of FIG. 2, based on instructions stored on a memory of the controller and in conjunction with signals received from sensors vehicle system, such as the sensors described above with reference to FIGS. 1-2. The controller may actuate vehicle system actuators, such as the actuators described above with reference to FIGS. 1-2, according to the methods described below.

Method 300 begins at 302 and includes determining whether a key-on event is indicated. A key-on event may comprise an ignition key being utilized to start the vehicle either in an engine-on mode (in which combustion is occurring in the engine, such as engine 110 of FIG. 1, and the resulting torque is used to propel the vehicle) or an electric-only mode of operation (in which the engine is off and an electric motor, such as motor 120 of FIG. 1, is supplied power to propel the vehicle). In other examples, a key-on event may comprise an ignition button being depressed to activate vehicle systems. Still other examples may include a key-fob (or other remote device, including a smartphone, a tablet, etc.) activating the vehicle in either the engine-on mode or the electric-only mode of operation. If, at 302, a key-on event is not indicated, method 300 proceeds to 304 and includes maintaining current vehicle operating parameters. For example, the engine, the electric motor, etc., may be maintained in their current modes of operation. Method 300 may then end.

Returning to 302, responsive to a key-on event being indicated, method 300 proceeds to 306 and includes accessing vehicle location, vehicle speed, driver information, day of the week (DOW), time of day (TOD), etc. A driver's identity may be input by the driver or inferred based on driving habits, seat position, cabin climate control preferences, voice activated commands, etc. Vehicle location may be accessed via an onboard navigation system, for example, via GPS, or through other means such as via wireless communication with the internet.

Proceeding to 308, method 300 includes recording vehicle route information during the drive cycle commencing from the key-on event. In some examples, vehicle route information may be divided into one or more segments, with the route beginning with a key-on event indicating a start location and ending with a key-off event (e.g., removal of an ignition key or a key fob leaving a threshold proximity of a vehicle, during such conditions the engine and electric machines that propel the vehicle may stop rotating) indicating a final destination. In contrast, segments may end with a key-off event indicating a temporary destination. Temporary destinations may include key-off events in which the vehicle is off for less than a first threshold duration, whereas final destinations may include key-off events in which the vehicle is off for at least the threshold duration. For example, the driver may stop for coffee on the way to work. The first threshold duration may be a non-zero amount of time after which the engine may be cooled down (e.g., 1-3 hours). However, it may be understood that there may be one or more engine stop/start events during each route segment. Such stop/start events may recorded, including the duration of each engine-on and engine-off period of the stop/start event, the location at which each stop/start event occurs, etc.

At 308, the vehicle controller may continuously collect data from various sensor systems and outside sources regarding the vehicle's operations/conditions, location, traffic information, local weather information, etc. The data may be collected by, for example, GPS (e.g., GPS 132 of FIG. 1), inertial sensors (e.g., sensors 199 of FIG. 1), lasers, radar, sonar, acoustic sensors, etc. Other feedback signals from sensors such as tire pressure sensors, engine temperature sensors, brake heat sensors, brake pad status sensors, tire tread sensors, fuel sensors, oil level and quality sensors, engine speed sensors, manifold pressure sensors, etc., may also be read from the vehicle. Further still, at 308, the vehicle controller may also retrieve various types of non-real time data, such as information from a detailed map, which may be stored at the controller or retrieved wirelessly. Accordingly, data regarding a particular vehicle driving route, or trip vector, may be obtained and stored at the vehicle controller during the course of the vehicle being driven along the particular route. Thus, segments may also be defined by other route information besides key-on and key-off events, such as vehicle location, vehicle speed, etc.

Proceeding to 310, method 300 may include establishing predicted/learned driving routes. For example, numerous trip vectors and corresponding information may be obtained and stored at the vehicle controller such that driving routes may be predicted/learned with high accuracy. Predicted/learned driving routes may include routes that are frequented according to a daily, weekly, or monthly schedule (e.g., within a common time of day and day of the week) and further have a common starting location and final destination. In some examples, a vehicle may travel route(s) that are not frequently traveled (e.g., not "common"). Thus, it may be understood that route information that is not significantly correlated with commonly driven routes may be periodically forgotten or removed from the vehicle controller in order to prevent exorbitant amounts of data pertaining to vehicle travel routes from accumulating.

In some examples, data collected from the vehicle travel routes, including GPS data, may be applied to an algorithm that feeds into one or more machine learning algorithms to determine common vehicle travel routes. Such an example is meant to be illustrative and is not meant to be limiting. For example, any commonly used methodology for vehicle route learning may be utilized by the vehicle controller in order to establish learned travel routes without departing from the scope of this disclosure.

Learning driving routes at 310 may include determining key-off events between and including a starting destination and a final destination. For example, learning driving routes at 310 may include learning/predicting stops (e.g., vehicle-off events) that are typically less than the first threshold duration (e.g., less than 1-3 hours) and may further include learning/predicting stops that are typically greater than the first threshold duration (e.g., greater than 1-3 hours). Further, learning driving routes at 310 may include determining an expected duration of continuous engine-on activity above idle speed within a particular route segment as well as an amount of manifold vacuum achieved during the engine-on activity. As discussed above and in further detail below, such information may be utilized to determine routes that enable fuel vapor storage canister purging.

At 312, method 300 includes storing information pertaining to the learned driving routes into one or more lookup tables at the vehicle controller. Such information may include segments of particular vehicle routes, the TOD and DOW each route is expected, an indication of routes in which a stop is indicated, average and peak vehicle speeds during the route, a learned/predicted duration of continuous engine-on activity above idle speed for each route segment, and average and peak manifold vacuum achieved during the continuous engine-on activity above idle speed, for example. Further, the controller may use map and/or GPS data to determine which routes and/or route segments correspond to city drives and which routes and/or route segments correspond to highway drives.

At 314, method 300 includes identifying routes for fuel vapor storage canister preheating. Routes for fuel vapor storage canister preheating may include routes in which the engine is on and operated above idle speed for at least a second threshold duration. The second threshold duration may be a non-zero value that is less than the first threshold duration described above and may correspond to a minimum amount of time for a fuel vapor storage canister purge event to be completed. The second threshold duration may vary based on an amount of manifold vacuum, with the second threshold duration decreasing as the amount of manifold vacuum increases. Furthermore, routes for fuel vapor storage canister preheating may include purge being enabled within a predetermined time frame after commencement of the drive cycle. Therefore, the controller may reference one or more lookup tables with a predicted continuous engine-on event duration and the average manifold vacuum achieved during the continuous engine-on event to identify routes that enable fuel vapor purging to occur and then identify routes for canister preheating based on purge being enabled within the predetermined time frame. Such identified routes may be stored at the controller, such as in a lookup table. Additionally or alternatively, the identified routes may be stored in the cloud. Following 314, method 300 ends.

As mentioned above, in a hybrid vehicle or a vehicle with a stop/start engine, driving routes that enable purging of a fuel vapor storage canister (e.g., fuel vapor storage canister 222 of FIG. 2) in an evaporative emissions system (e.g., evaporative emissions system 219 of FIG. 2) may be limited due to the engine frequently being shut off. Further, even when canister purging is enabled, such as when conditions for canister purging are met (as described below), there may not be enough time before the next engine shutdown to heat the fuel vapor storage canister sufficiently to desorb the heavy ends of the fuel vapor hydrocarbons. As a result, fuel vapor storage canister purging may be incomplete, and fuel vapors (particularly heavy ends) may escape to the atmosphere as bleed emissions. Therefore, by identifying routes for fuel vapor storage canister preheating, the fuel vapor storage canister may be heated preemptively in order to quickly purge the fuel vapor storage canister (of both light ends and heavy ends) as soon as purge conditions are met.

Continuing to FIG. 4, an example method 400 for fuel vapor storage canister preheating is shown. Particularly, a canister heating element of the fuel vapor storage canister (e.g., canister heating element 216 of FIG. 2) may be activated by a controller (e.g., controller 12 of FIG. 2) while the vehicle is off in anticipation of an identified driving route for fuel vapor storage canister preheating. Further, the controller may perform an emissions test on the evaporative emissions system while the vehicle remains off. Thus, even if fuel vapor storage canister purging does not occur after the fuel vapor storage canister preheating, the preheating may be used as a diagnostic tool, and the energy consumed by the canister heating element is not wasted.

Method 400 begins at 402 and includes determining if fuel vapor storage canister preheating conditions are met. For example, after the vehicle is shut down and before the controller goes into a sleep mode, the controller may determine if an identified driving route for fuel vapor storage canister preheating, as described with respect to FIG. 3, is predicted as the next driving route. That is, based on known driving data, the controller may determine that, following a subsequent vehicle key-on event, the vehicle is expected to be driven in a route that enables fuel vapor storage canister purging, such as a route in which the engine will remain active for at least a threshold duration (e.g., the second threshold duration described above at 314) within a predetermined time frame. The controller may further assess fuel vapor storage canister load and determine if the fuel vapor storage canister load (e.g., an amount of fuel vapors stored in the fuel vapor storage canister) is greater than or equal to a threshold load. The threshold load may correspond to a non-zero amount of adsorbed fuel vapors below which purging may not be beneficial (e.g., the fuel vapor storage canister does not need to be cleaned). Therefore, the fuel vapor storage canister preheating conditions may include an identified driving route for fuel vapor storage canister preheating being predicted as the next driving route and the fuel vapor storage canister load being at or above the threshold load. The fuel vapor storage canister preheating conditions may optionally further include a state of charge (SOC) of an energy storage device of the vehicle (e.g., energy storage device 150) being greater than a threshold SOC. The threshold SOC may be non-zero amount of charge, such as a percentage of a total charge capacity, below which the energy storage device may not be able to support or execute additional vehicle functions (such as operating the vehicle in an electric mode) upon startup. However, if the vehicle is coupled to a stationary electric power grid or solar energy is available, fuel vapor storage canister preheating may be activated even if the SOC is less than the threshold.

If the fuel vapor storage canister preheating conditions are not met, such as when an identified driving route for fuel vapor storage canister preheating is not predicted as the subsequent driving route, when the fuel vapor storage canister load is below the threshold, and/or optionally when the energy storage device SOC is less than the threshold SOC, method 400 proceeds to 404 and includes maintaining vehicle operating parameters. For example, the controller may continue to perform a shut-down operation and may not set a timer to wake the controller to perform the fuel vapor storage canister preheating. Following 404, method 400 ends.

If the fuel vapor storage canister preheating conditions are met, method 400 proceeds to 406 and includes setting a timer to wake the controller prior to vehicle start. For example, the timer may be set to wake the controller a duration (e.g., 10 min) before a predicted vehicle key-on event for the identified driving route. The duration may be determined based on a size (e.g., mass) of the fuel vapor storage canister (with the duration increasing as the size of the fuel vapor storage canister increases), ambient temperature, forecast weather conditions, fuel vapor storage canister load, and known properties of the canister heating element (e.g., an achievable rate of heating). For example, as a difference between a desired fuel vapor storage canister temperature to achieve through the preheating and the current (or forecast) ambient temperature increases, the duration may increase. As another example, as the fuel vapor storage canister load increases, the duration may increase, as it may take more energy to raise the temperature of the fuel vapor storage canister as heat is consumed through fuel vapor desorption. Note that if an unexpected controller wake-up occurs, such as when the vehicle is started for an unpredicted trip, the method may return to 402 upon the subsequent vehicle shut-down and reassess whether the fuel vapor storage canister preheating conditions are met. Thus, if the fuel vapor storage canister preheating conditions do not continue to be met, the timer may be cancelled.

At 408, method 400 includes waking the controller. For example, when the timer elapses, the controller may returned (e.g., transitioned) to an awake mode. If the vehicle is a plug-in HEV, grid power (e.g., from power source 180 of FIG. 1) may be used to power the controller. If the vehicle includes solar cells (e.g., solar cells 108 of FIG. 1) and solar energy is available, then the solar energy may be used to power the controller (e.g., from solar battery 30 and/or charge controller 32 of FIG. 1). Thus, the controller may be powered with energy from the energy storage device only when alternative sources of power are unavailable.

At 410, method 400 includes commanded closed a canister vent valve (e.g., CVV 214 of FIG. 2) that couples the fuel vapor storage canister to the atmosphere and activating the canister heating element. By closing the CVV, pressure may build in the evaporative emissions system as fuel vapor is desorbed from the heating fuel vapor storage canister. Further, with the CVV closed, bleed emissions may not occur. Activating the canister heating element may include supplying electrical power to the canister heating element so that the canister heating element generates heat, which can then be transferred to the fuel vapor storage canister, including adsorbent within the fuel vapor storage canister. The amount of power supplied to the canister heating element may be modulated based on a temperature of the fuel vapor storage canister, such as measured by a temperature sensor (e.g., temperature sensor 215 of FIG. 2). For example, a relatively high amount (or duty cycle) of power may be supplied to the canister heating element initially in order to quickly increase the temperature of the fuel vapor storage canister to a desired temperature (e.g., 150° F.). Then, once the fuel vapor storage canister reaches the desired temperature, the amount (or duty cycle) of power supplied to the canister heating element may be decreased in order to maintain the temperature of the fuel vapor storage canister at the desired temperature. For example, the controller may input the temperature of the fuel vapor storage canister, ambient temperature, and the mass of the fuel vapor storage canister into a lookup table or function and output the amount (or duty cycle) of power to supply to the canister heating element.

At 412, method 400 includes determining if the canister heating element is functional. For example, if the canister heating element is functional, the temperature of the fuel vapor storage canister is expected to increase. Therefore, determining if the canister heating element is functional may include measuring the temperature of the fuel vapor storage canister with the temperature sensor coupled to the fuel vapor storage canister. Alternatively, a hydrocarbon (HC) sensor (e.g., HC sensor 213 of FIG. 2) may be used to determine if the canister heating element is functional. For example, if the canister heating element is functional, as the fuel vapor storage canister heats up, fuel vapors may desorb from adsorbent of the fuel vapor storage canister. However, if the canister heating element is not functional, fuel vapors may not desorb from the adsorbent.

Therefore, if the temperature of the fuel vapor storage canister does not increase by at least a threshold amount and/or if the HC sensor does not detect fuel vapors (e.g., gaseous HCs) by a predetermined duration (e.g., 5 min) after the canister heating element is activated, it may be determined that the canister heating element is not functional, and method 400 proceeds to 414. At 414, method 400 includes indicating that the canister heating element is degraded. Indicating that the canister heating element is degraded may include setting a corresponding diagnostic trouble code (DTC) at the controller. Furthermore, a malfunction indicator light (MIL) may be illuminated on a dash of the vehicle, for example, to alert a vehicle operator to service the vehicle, and may further include indicating the reason for the MIL. Even with the canister heating element degraded, purging may still occur, as will be described below. However, without the fuel vapor storage canister heated by the canister heating element, heavy ends may remain adsorbed to the adsorbent of the fuel vapor storage canister and may not be purged.

If instead the temperature of the fuel vapor storage canister increases by at least the threshold amount and/or if the HC sensor detects fuel vapors (e.g., gaseous HCs) by the predetermined duration after the canister heating element is activated, it may be determined that the canister heating element is functional, and method 400 proceeds to 416. At 416, method 400 includes monitoring the pressure of the evaporative emissions system for a duration. The duration may be a predetermined duration over which a pressure increase due to fuel vapors desorbing from the fuel vapor storage canister is expected. The pressure in the evaporative emissions system may be measured by a pressure sensor, such as second pressure sensor 238 of FIG. 2. However, in other examples where a fuel tank isolation valve is not included (e.g., FTIV 236 of FIG. 2 is omitted), a fuel tank pressure sensor, such as FTPT 217 of FIG. 2, may be used to measure the pressure of both the fuel system and the evaporative emissions system.

At 418, it is determined if the pressure is greater than a threshold pressure. The threshold pressure may be a non-zero, positive amount of pressure above atmospheric (e.g., ambient) pressure above which it may be determined that fuel vapors are not released from the evaporative emissions system. The threshold may vary based on the fuel vapor storage canister load prior to fuel vapor storage canister heating, with the threshold increasing as the fuel vapor storage canister load increases. For example, before the CVV is closed and the canister heating element is activated (e.g., at 410), the evaporative emissions system may be equilibrated to atmospheric pressure. Then, as the fuel vapors are desorbed due to fuel vapor storage canister heating, the pressure of the sealed evaporative emissions system is expected to increase, with the pressure further increasing when the fuel vapor storage canister load is greater (and thus, there are more fuel vapors available for desorption). If the pressure is greater than the threshold, method 400 proceeds to 420 and includes indicating that no degradation is detected in the evaporative emissions system. Method 400 may then proceed to 422, as will be described below.

If the pressure is not greater than the threshold at 418, such as when the pressure is less than or equal to the threshold, method 400 proceeds to 421 and includes indicating that degradation is detected in the evaporative emissions system. For example, with the canister heating element confirmed as functional (and the fuel vapor storage canister load greater than the threshold load), a lack of sufficient pressure build in the evaporative emissions system suggests that the pressure (and fuel vapors) may be escaping to the atmosphere through an orifice (e.g., a hole or disconnection between components), resulting in an increase in vehicle emissions. Indicating degradation in the evaporative emissions system may include setting a corresponding DTC at the controller. Furthermore, a MIL may be illuminated on the dash of the vehicle, for example, to alert the vehicle operator to service the vehicle, and may further include indicating the reason for the MIL.

At 423, method 400 includes disabling purging. For example, if the fuel vapor storage canister were purged while the orifice is present in the evaporative emissions system, unmetered air may enter through the orifice, causing the engine to run lean. Therefore, purge may be disabled until the vehicle is serviced and the DTC is cleared. However, in other examples, purge may be re-enabled based on the outcome(s) of one or more subsequent evaporative emissions system diagnostic tests. For example, a subsequent bleed-up test may be performed in which the evaporative emissions system is evacuated, sealed, and then the pressure increase (e.g., bleed-up) measured over a duration. If the bleed-up test shows that the orifice is large (e.g., larger than a threshold diameter), such as when the rate of pressure increase is greater than a threshold rate, purge may remain disabled until the DTC is cleared. The threshold diameter may correspond to a non-zero diameter above which unmetered air drawn through the orifice may cause the engine to run significantly lean, which may degrade engine performance. If the bleed-up test shows that the orifice is small (e.g., less than or equal to the threshold diameter), such as when the rate of pressure increase is less than or equal to the threshold rate, purge may be re-enabled, as the amount of air that may be drawn through the orifice may not be enough to cause the engine to run significantly lean. As such, purge may be performed in response to purge conditions being met, as will be described below. By purging the fuel vapor storage canister after purge is re-enabled even when evaporative emissions system degradation is detected in some examples, fuel vapors may be effectively directed to the engine intake instead of being released to the atmosphere as undesired evaporative emissions. Following 423, method 400 ends.

At 422, method 400 includes determining if purge conditions are met. The controller may begin monitoring for the purge conditions being met as soon as the drive cycle has commenced. The purge conditions may include the vehicle being propelled using torque from the engine (e.g., the vehicle is on and the engine is on and operating above idle speed). The purge conditions may further include an indication of manifold pressure (e.g., MAP) being less than atmospheric pressure by a predetermined threshold amount (e.g., manifold vacuum is greater than a threshold vacuum), indicating that there is sufficient manifold vacuum to draw the desorbed fuel vapors into the engine intake.

If the purge conditions are not met, method 400 proceeds to 424 and includes determining if a threshold duration has elapsed. The threshold duration may account for a first segment of the driving route not enabling purge, for example, and/or for slight variations in driving activity. As one example, the threshold duration may be at least partially determined based on a standard deviation of the average start time of the identified driving route. For example, if the start time is at 8:30 with a standard deviation of 5 minutes, the threshold duration may be set as 5 minutes. As another example, the threshold duration may be a fixed, predetermined duration (e.g., the predetermined time frame) for all identified driving routes. In one non-limiting example, the threshold duration may be in the range of 10 to 15 minutes. In still another example, the threshold duration may be a predetermined duration (e.g., 10-15 minutes) that is further adjusted based on known variances in the identified route start time (such as the standard deviation) and/or further adjusted based on route traffic (which may cause the vehicle to be on but the engine off, for example) or other identified factors that may prevent the purge conditions from being met. In still other examples, the predetermined duration may be a distance traveled by the vehicle. Further, in some examples, the threshold duration may be adjusted based on the SOC of the energy storage device. For example, when the SOC of the energy storage device is less than the threshold SOC and the vehicle electrical generation capacity (e.g., via a generator and/or the solar cells) is less than needed to provide a desired rate of charging, the threshold duration may be decreased.

If the threshold duration has not elapsed, method 400 may return to 422, and the controller may continue to monitor for an indication of the purge conditions being met. If the threshold duration has elapsed, method 400 proceeds to 426 and includes deactivating the canister heating element. With the threshold duration elapsed, it may be assumed that purge conditions may not occur as anticipated. As one example, the vehicle may remain at rest, without the identified route driven. Therefore, continued heating of the fuel vapor storage canister is not beneficial and may unnecessarily consume power. However, if the solar cells are providing sufficient charge to maintain fuel vapor storage canister heating or if an electric machine of the vehicle has capacity to generate charge from engine power that is sufficient to maintain fuel vapor storage canister heating, fuel vapor storage canister heating may continue even after the duration has been exceeded. Deactivating the canister heating element may include stopping the supply of power to the canister heating element, for example.

At 428, method 400 optionally includes putting the controller to sleep. For example, the controller may be put to sleep if the vehicle remains off. As such, the controller remaining on may unnecessarily consume power. However, the controller may not be put to sleep if the vehicle is on and/or if the controller is performing other (non-preheating) functions, such as other diagnostic routines, transmitting data, etc. Following 428, method 400 ends.

Returning to 422, if the purge conditions are met, such as when the vehicle is on and being propelled by engine torque and manifold pressure is less than a threshold, method 400 proceeds to 430 and includes commanding open a canister purge valve (CPV), such as CPV 212 of FIG. 2, and commanding open the CVV to purge the contents of the fuel vapor storage canister (and the desorbed fuel vapors in the evaporative emissions system) to the engine intake. Furthermore, if included, purging the fuel vapor storage canister may include maintaining closed the FTIV. By commanding open the CPV with the CVV open (and the FTIV closed), fresh air may be drawn across the fuel vapor storage canister, thus desorbing adsorbed hydrocarbons from the fuel vapor storage canister. Desorbed hydrocarbons may be routed through the open CPV to the engine intake for combustion. Accordingly, at 432, method 400 may optionally include monitoring the purge flow. For example, one or more exhaust gas oxygen sensors (e.g., exhaust gas oxygen sensor 226 of FIG. 2) may be positioned in the engine exhaust to provide an estimate of the amount of fuel vapors purged to the engine intake. Alternatively, a sensor coupled to the engine intake may provide an indication of the amount of fuel vapors purged to the engine intake, such as an intake oxygen sensor. Based on the fuel vapor storage canister load, and further based on engine operating conditions, such as engine speed-load conditions, a purge flow rate may be determined. Note that if the canister heating element was determined to be degraded (e.g., at 412), light ends may be purged while heavy ends may remain adsorbed in the fuel vapor storage canister. If the canister heating element was determined to be functional, both light ends and heavy ends may be purged.

At 434, method 400 includes determining if the purge event is complete. For example, the purge event may be complete when the fuel vapor storage canister load reaches a lower threshold fuel vapor storage canister load. The lower threshold fuel vapor storage canister load may refer to a fuel vapor storage canister load at which it may be determined that the fuel vapor storage canister is sufficiently clean and able to adsorb more fuel vapors, for example, during subsequent refueling events. The lower threshold fuel vapor storage canister load may vary depending on whether or not the canister heating element was determined to be functional at 412. For example, the lower threshold fuel vapor storage canister load may be lower if the canister heating element was determined to be functional and higher if the canister heating element was determined to be degraded, as the heavy ends may remain adsorbed.

If, at 434, it is determined that fuel vapor storage canister purging is not complete, method 400 proceeds to 436 to continue purging the contents of the fuel vapor storage canister to the engine intake. However, if at 434 it is determined that the purging event is complete, method 400 proceeds to 438 and includes commanding closed the CPV to discontinue purging. By commanding closed the CPV, the fuel vapor storage canister may be sealed from the engine intake.

At 440, method 400 includes deactivating the canister heating element. With the purge event complete, it is no longer beneficial to maintain the temperature of the fuel vapor storage canister at the desired temperature. As described above, deactivating the canister heating element may include stopping the supply of power to the canister heating element.

At 442, method 400 includes updating the evaporative emissions system status. For example, updating the evaporative emissions system status may include indicating that the fuel vapor storage canister has been cleaned of stored fuel vapors. More specifically, it may be indicated that the fuel vapor storage canister has been cleaned of both HC light ends and HC heavy ends if the canister heating element was determined to be functional, or it may be indicated that the fuel vapor storage canister has been cleaned of HC light ends if the canister heating element was determined to be degraded. Such an indication may be stored at the controller, for example. Updating the evaporative emissions system status may additionally include updating a fuel vapor storage canister purge schedule. For example, responsive to the indication that the fuel vapor storage canister has been sufficiently cleaned of both HC light ends and HC heavy ends, a future fuel vapor storage canister purge operation may be postponed or rescheduled. Following 442, method 400 ends.

Thus, in one example, the method may include determining a first key-off event (e.g., a first time the vehicle is off), and in response thereto, setting a timer to wake a controller of a vehicle in order to actuate a canister heating element coupled to a fuel vapor storage canister; and determining a second key-off event (e.g., a second time the vehicle is off, which may not be the first time the vehicle is off), and in response thereto, not setting the timer to wake the controller. For example, the first key-off event may correspond to a key-off event in which fuel vapor storage canister preheating is indicated, such as when a driving route that enables fuel vapor storage canister purging is predicted as the subsequent driving route and a load of the fuel vapor storage canister is greater than a threshold load. The second key-off event may correspond to a condition in which fuel vapor storage canister preheating is not indicated, such as when a driving route that enables fuel vapor storage canister purging is not predicted as the subsequent driving route and/or the load of the fuel vapor storage canister is less than the threshold load. Thus, in some examples, setting a timer to wake the controller to actuate the canister heating element occurs while the second key-off event is not present and/or while or during the first key-off event. The second key-off event may not be present during the first key-off event, and the first key-off event may not be present during the second key-off event. However, one of the first key-off event and the second key-off is present when the vehicle is shut down.

Further, instructions stored in memory may include determining the first key-off event based on data stored at the memory of the controller, such as data concerning vehicle driving routes, and further based on an indication that the vehicle is being shut down (e.g., as indicated by an ignition switch position). In response to determining the first key-off event, instructions stored in memory may actuate a timer function to wake the controller at a determined duration prior to a predicted commencement time of a subsequent drive cycle. In response to the controller transitioning from a sleep mode to an awake mode once the timer elapses, the canister heating element may be actuated by instructions for sending a signal to the canister heating element. In some examples, the method may include determining whether to perform one or more of each of setting the timer to wake the controller and activating the canister heating element based on a determination of whether the first key-off event is present and a determination of whether the second key-off event is present.

Turning next to FIG. 5, an example timeline 500 of vehicle system (e.g., vehicle system 206 of FIG. 2) parameters during a fuel vapor storage canister preheating event and subsequent purge event is shown. For example, the fuel vapor storage canister (e.g., fuel vapor storage canister 222 of FIG. 2) may be preheated according to the method of FIG. 4 after driving routes for fuel vapor storage canister preheating are identified according to the method of FIG. 3. Further, while the fuel vapor storage canister is preheated, an evaporative emissions system test may be performed due to pressure generated from fuel vapors desorbing from the fuel vapor storage canister.

The example timeline 500 shows the engine operated in a stop/start mode, although the methods describe herein may also be used with other modes of operation (such as when the vehicle switches between engine-only and electric-only modes of operation). Vehicle state is shown in plot 502, engine state is shown in plot 504, vehicle speed is shown in plot 506, fuel vapor storage canister load is shown in plot 508, fuel vapor storage canister temperature ($T_{canister}$) is shown in plot 510, evaporative emissions system pressure ($P_{evap\_sys}$) is shown in plot 512 CVV position is shown in plot 514, CPV position is shown in plot 516, an indication of whether the canister heating element is on or off is shown in plot 518, and an indication of whether purge conditions are met is shown in plot 520. For all of the above, the horizontal axis represents time, with time increasing along the horizontal axis from left to right. The vertical axis represents each labeled parameter, with values increasing from bottom to top, except for plots 502, 504, and 518, in which the vehicle, the engine, and the canister heating element, respectively, are indicated as "on" or "off"; plots 514 and 516, in which the CVV and CPV, respectively, are indicated as "open" or "closed"; and plot 520, in which purge conditions being met is indicated as "yes" or "no." Furthermore, dashed line 522 represents a first, higher threshold fuel vapor storage canister load above which fuel vapor storage canister preheating may be beneficial, dashed line 524 represents a second, lower threshold fuel vapor storage canister load at which the fuel vapor storage canister may be considered clean, dashed line 526 represents an optimal fuel vapor storage canister operating temperature (e.g., a desired temperature), dashed line 528 represents a threshold pressure above which no degradation is indicated in the evaporative emissions system, and dashed line 530 represents atmospheric pressure.

Prior to time t1, the vehicle is off (plot 502) and thus, the engine is also off (plot 504). With the vehicle off (e.g., the engine is not rotating and electrical propulsion devices, if present, are deactivated or not supplied with power), the vehicle is at rest (plot 506). The temperature of the fuel vapor storage canister (plot 510) may be at ambient temperature. Further, with the CVV (e.g., CVV 214 of FIG. 2) open (plot 514), coupling the fuel vapor storage canister to the atmosphere, the pressure of the evaporative emissions system (e.g., evaporative emissions system 219 of FIG. 2) is at atmospheric pressure (dashed line 530), as shown in plot 512. With the CPV (e.g., CPV 212 of FIG. 2) closed (plot 516), the evaporative emissions system remains isolated from an intake of the engine (e.g., engine intake 244 of FIG. 2). Furthermore, with the fuel vapor storage canister load (plot 508) above the first, higher threshold fuel vapor storage canister load (dashed line 522), a condition for fuel vapor storage canister preheating is met. In response to an identified driving route for fuel vapor storage canister preheating being anticipated as the next driving route, the fuel vapor storage canister preheating conditions may be met prior to time t1, and a timer may be set to wake the controller for a fuel vapor storage canister preheating event, as described with respect to FIGS. 3-4.

At time t1, the timer elapses after a predetermined duration and wakes the controller. In response, the controller closes the CVV (plot 514) to seal the evaporative emissions system and activates the canister heating element (e.g., canister heating element 216 of FIG. 2), as shown in plot 518. With the canister heating element activated, the temperature of the fuel vapor storage canister increases (plot 510), such as measured by a temperature sensor coupled to the fuel vapor storage canister (e.g., temperature sensor 215 of FIG. 2), indicating that the canister heating element is functional. With the canister heating element functional, the pressure of the sealed evaporative emissions system may be monitored as an emissions test. For example, the pressure of the evaporative emissions system may be measured by a pressure sensor coupled to the evaporative emission system (such as second pressure sensor 238 shown in FIG. 2). The pressure of the evaporative emissions system increases above atmospheric pressure (plot 512) as fuel vapors are desorbed from the fuel vapor storage canister and surpasses the threshold pressure (dashed line 528) between time t1 and time t2, indicating that no degradation is present in the evaporative emissions system.

At time t2, the vehicle is turned on (plot 502), such as responsive to a key-on event. The engine is also started (plot 504). The controller may then begin checking for purge conditions being met. The vehicle is initially driven for two short durations at relatively low vehicle speeds (plot 506). Each time the vehicle speed (plot 506) reaches zero, such as when the vehicle is stopped at a stop light, the engine is shut down (plot 504) and restarted in response to a request for torque (e.g., from a vehicle operator). Further, the controller may anticipate these initial engine shutdowns and low vehicle speeds based on data concerning the vehicle driving route that is stored on a memory of the controller. Thus, the purge conditions may not be met due to the engine shutdown events (plot 520). However, the canister heating element may remain on (plot 518) to maintain the fuel vapor storage canister temperature (plot 510) at the optimum operating temperature (dashed line 526) in anticipation of the purge conditions being met in less than a threshold duration, with the threshold duration determined based on the route being driven (as described with reference to FIG. 4).

Before time t3, the vehicle speed (plot 506) increases, such as due to the vehicle being driven on the highway. Further, the controller may anticipate the highway segment of the driving route based on data stored at the controller. At time t3, the purge conditions are met (plot 520), such as in response to manifold vacuum being greater than a threshold manifold vacuum, the engine anticipated to be continuously operated for at least a threshold duration that will allow complete purging, etc. Responsive to the purge conditions being met, the CVV (plot 514) and the CPV (plot 516) are both commanded open. Vacuum from the naturally aspirated engine draws the desorbed fuel vapors, including both hydrocarbon heavy ends and light ends, through a purge line (e.g., purge line 228 of FIG. 2) to the engine intake. As a result of the vacuum drawn on the evaporative emissions system, the pressure of the evaporative emissions system decreases below atmospheric pressure (plot 512). During the purge event, the fuel vapor storage canister load (plot 508) decreases and reaches the second, lower threshold fuel vapor storage canister load (dashed line 524) at time t4. Thus, the fuel vapor storage canister is determined to be sufficiently cleaned of adsorbed hydrocarbons, thereby increasing fuel vapor storage canister adsorption capacity for future fuel vapor storage canister hydrocarbon adsorption events, and the purge conditions are no longer met (plot 520). As a result, the CPV is commanded closed (plot 516), and the evaporative emissions system pressure (plot 512) may begin to equilibrate with atmospheric pressure (dashed line 530). Furthermore, with the purge event complete, the canister heating element is deactivated (plot 518). As such, the temperature of the fuel vapor storage canister may begin to decrease (plot 510).

At time t5, the highway segment of the vehicle driving route is complete and a city drive segment of the driving route commences. The city drive segment includes a relatively low vehicle speed (plot 506) and frequent engine shut down events (plot 504) while the vehicle is stopped before a vehicle key-off event at time t6 (at which time the engine and the vehicle are shut down). Such frequent engine shut down events would not provide conditions for complete fuel vapor storage canister purging. Furthermore, if the fuel vapor storage canister had not been preheated prior to vehicle start, such as if the canister heating element had remained off until vehicle start (dashed segment 518a), the temperature of the fuel vapor storage canister may have reached optimal operating temperature only shortly before the end of the highway drive segment, as indicated by dashed segment 510a. This may have prevented the fuel vapor storage canister from being sufficiently cleaned, thereby reducing the fuel vapor storage canister adsorption capacity for subsequent hydrocarbon adsorption events (such as during refueling). Thus, by preheating the fuel vapor storage canister before the vehicle is started at time t2, both hydrocarbon heavy ends and light ends may be purged to the engine intake, even with limited purging opportunities due to frequent engine-off events.

In this way, a fuel vapor storage canister included in a vehicle system operating in a mode in which the engine is frequently shut down, such as a stop/start mode of operation, may be efficiently cleaned. In particular, by preheating the fuel vapor storage canister, purging of hydrocarbon heavy ends may be expedited as soon as purge conditions are met. In this way, vehicle bleed emissions may be reduced. Furthermore, energy may be conserved by preheating the fuel vapor storage canister only when a driving route that will enable purging is anticipated. Further still, by performing an emissions test during the fuel vapor storage canister preheating, energy may be further conserved by taking advantage of the increased pressure that occurs as fuel vapor desorbs from adsorbent in the fuel vapor storage canister. In this way, even if purging does not occur as anticipated, the energy consumed through fuel vapor storage canister preheating is utilized in the emissions test.

The technical effect of preheating a fuel vapor storage canister while a vehicle is off in anticipation of conditions that enable fuel vapor storage canister purging is that fuel vapor storage canister cleaning may be expedited and hydrocarbon heavy ends may be efficiently purged.

As one example, an evaporative emissions method comprises: while a vehicle remains off, preheating a fuel vapor storage canister in an evaporative emissions system of the vehicle to a desired temperature at a determined duration prior to commencing a drive cycle; and purging vapors stored in the fuel vapor storage canister to an intake of an engine of the vehicle after the commencement of the drive cycle. In the preceding example, additionally or optionally, the drive cycle includes a learned drive cycle that enables the purging, and wherein the purging occurs during the drive cycle. In any or all of the preceding examples, additionally or optionally, the determined duration is based on ambient temperature, a size of the fuel vapor storage canister, and a load of the fuel vapor storage canister. In any or all of the preceding examples, additionally or optionally, preheating the fuel vapor storage canister includes waking a controller of the vehicle from a sleep mode at the determined duration, the controller then actuating a canister heating element coupled to the fuel vapor storage canister. In any or all of the preceding examples, the method additionally or optionally further comprises performing an emissions test on the evaporative emissions system prior to the purging in response to an indication that the canister heating element is functional. In any or all of the preceding examples, additionally or optionally, the purging occurs within a threshold duration after the commencement of the drive cycle, and the indication that the canister heating element is functional includes at least one of a temperature of the fuel vapor storage canister reaching a threshold temperature within a predetermined duration, which is shorter than the threshold duration, and a hydrocarbon sensor coupled to the evaporative emissions system detecting desorbed fuel vapors within the predetermined duration. In any or all of the preceding examples, additionally or optionally, the purging occurs within a threshold duration after the commencement of the drive cycle, and performing the emissions test on the evaporative emissions system includes measuring a pressure of the evaporative emissions system over a second predetermined duration, which is shorter than the threshold duration, and the method additionally or optionally further comprises: indicating no degradation is detected in the evaporative emissions system in response to the pressure of the evaporative emissions system reaching a threshold pressure within the second predetermined duration; and indicating degradation is detected in the evaporative emissions system in response to the pressure of the evaporative emissions system not reaching the threshold pressure within the second predetermined duration. In any or all of the preceding examples, the method additionally or optionally further comprises preheating the fuel vapor storage canister via energy from a power grid external to the vehicle or a solar panel.

As another example, an evaporative emissions method, comprises: setting a timer to wake a controller of a vehicle to preheat a fuel vapor storage canister prior to an anticipated vehicle key-on event that occurs after a first key-off event and before the controller transitions to a sleep mode; and not setting the timer to preheat the fuel vapor storage canister after a second key-off event and before the controller transitions to the sleep mode. In the preceding example, additionally or optionally, the timer is set for preheating the fuel vapor storage canister when an identified driving route for fuel vapor storage canister preheating is anticipated subsequent to the anticipated vehicle key-on event and when a fuel vapor load of the fuel vapor storage canister is greater than a threshold load. In any or all of the preceding examples, additionally or optionally, the timer is set for a determined duration prior to the anticipated vehicle key-on event. In any or all of the preceding examples, the method additionally or optionally further comprises, after the timer elapses and the controller is awoken: actuating a canister heating element coupled to the fuel vapor storage canister; commanding closed a canister vent valve in a vent line that couples the fuel vapor storage canister to the atmosphere; and monitoring a pressure of an evaporative emissions system. In any or all of the preceding examples, the method additionally or optionally further comprises, in response to the pressure of the evaporative emissions system not reaching a threshold pressure within the determined duration, indicating degradation of the evaporative emissions system. In any or all of the preceding examples, additionally or optionally, the indicating degradation is present in the evaporative emissions system is further in response to a temperature of the fuel vapor storage canister reaching or surpassing a threshold temperature within the determined duration. In any or all of the preceding examples, the method additionally or optionally further comprises, after the anticipated vehicle key-on event, purging fuel vapors from the evaporative emissions system to an engine intake of the vehicle responsive to purge conditions being met. In any or all of the preceding examples, additionally or optionally, the purge conditions include the vehicle being propelled by the engine and an amount of vacuum in the engine intake being greater than a threshold vacuum. In any or all of the preceding examples, additionally or optionally, the purging includes commanding open the fuel vapor storage canister vent valve and a fuel vapor storage canister purge valve in a purge line that couples the evaporative emissions system to the engine intake.

As a third example, a system for a vehicle, comprises: an engine system, including an engine configured to propel the vehicle by combusting air and fuel; a fuel system, including a fuel tank for storing the fuel; an evaporative emissions system in fluidic communication with the fuel system and an intake of the engine via a purge line, the evaporative emissions system including a fuel vapor storage canister; a canister heating element coupled to the fuel vapor storage canister; a canister vent valve positioned in a vent line of the evaporative emissions system; a canister purge valve positioned in the purge line; and a controller storing instructions in non-transitory memory that, when executed, cause the controller to: wake from a sleep mode and actuate the canister heating element a duration prior to an anticipated vehicle start a first time the vehicle is off; and remain in the sleep mode a second time the vehicle is off. In the preceding example, additionally or optionally, during the first time the vehicle is off, a driving route enabling purging of the fuel vapor storage canister is predicted and a load of the fuel vapor storage canister being greater than a threshold load is predicted subsequent to the anticipated vehicle start, and during the second time the vehicle is off, at least one of a driving route not enabling purging of the fuel vapor storage canister and the load of the fuel vapor storage canister being less than or equal to the threshold load is predicted subsequent to the anticipated vehicle start. In any or all of the preceding examples, additionally or optionally, the predicted driving route is learned based on data gathered while the vehicle is driven.

In another representation, a method comprises: differentiating between a first vehicle key-off condition and a second vehicle key-off condition; setting a timer to wake a controller in response to the first vehicle key-off condition; and maintaining the controller in a sleep mode in response to the second vehicle key-off condition. In the preceding example, additionally or optionally, the differentiating includes selecting between the first vehicle key-off condition and the second vehicle key-off condition based on one or more of an anticipated driving route following a subsequent vehicle key-on event and a fuel vapor load of a fuel vapor storage canister. In any or all of the preceding examples, additionally or optionally, the first vehicle key-off condition is selected when a driving route that enables purging of the fuel vapor storage canister is the anticipated driving route, and the second vehicle key-off condition is selected when a driving route that does not enable purging of the fuel vapor storage canister is the anticipated driving route. In any or all of the preceding examples, additionally or optionally, the first vehicle key-off condition is selected when the fuel vapor load of the fuel vapor storage canister is above a threshold load, and the second vehicle key-off condition is selected when the fuel vapor load of the fuel vapor storage canister is less than or equal to the threshold load. In any or all of the preceding examples, the method additionally or optionally further comprises, after waking the controller in response to the first vehicle key-off condition being selected, actuating a canister heating element coupled to the fuel vapor storage canister. In any or all of the preceding examples, additionally or optionally, the timer is set for a determined duration prior to the subsequent vehicle key-on event. In any or all of the preceding examples, additionally or optionally, a timing of the subsequent vehicle key-on event is determined based on driving route data stored in a memory of the controller.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An evaporative emissions method, comprising:
setting a timer to wake a controller of a vehicle to preheat a fuel vapor storage canister prior to a first anticipated vehicle key-on event that occurs after a first key-off event and before the controller transitions to a sleep mode after the first key-off event; and after the timer elapses and the controller is awoken:
actuating a canister heating element coupled to the fuel vapor storage canister, the fuel vapor storage canister included in an evaporative emissions system in fluidic communication with a fuel system of the vehicle and an intake of an engine of the vehicle;
commanding closed a canister vent valve in a vent line that couples the fuel vapor storage canister to atmosphere;
maintaining closed a canister purge valve in a purge line that couples the evaporative emissions system to the intake; and
monitoring a pressure of the evaporative emissions system.

2. The method of claim 1, wherein the first anticipated vehicle key-on event includes an identified driving route for fuel vapor storage canister preheating anticipated subsequent to the first anticipated vehicle key-on event and a fuel vapor load of the fuel vapor storage canister that is greater than a threshold load, and the identified driving route learned based on data gathered while the vehicle is driven.

3. The method of claim 1, wherein setting the timer includes setting the timer for a determined duration prior to the first anticipated vehicle key-on event.

4. The method of claim 2, further comprising not setting the timer to preheat the fuel vapor storage canister prior to a second anticipated vehicle key-on event that occurs after a second key-off event and before the controller transitions to the sleep mode after the second key-off event, wherein the second anticipated key-on event does not include the identified driving route for fuel vapor storage canister preheating anticipated subsequent to the second anticipated vehicle key-on and/or the fuel vapor load of the fuel vapor storage canister is not greater than the threshold load.

5. The method of claim 1, further comprising:
in response to the pressure of the evaporative emissions system not reaching a threshold pressure after actuating the canister heating element within the determined duration, indicating degradation of the evaporative emissions system.

6. The method of claim 5, wherein the indicating degradation of the evaporative emissions system is further in response to a temperature of the fuel vapor storage canister reaching or surpassing a threshold temperature within the determined duration.

7. The method of claim 1, further comprising:
after the first anticipated vehicle key-on event, purging fuel vapors from the evaporative emissions system to the intake of the engine responsive to purge conditions being met.

8. The method of claim 7, wherein the purge conditions include the vehicle being propelled by the engine and an amount of vacuum in the intake being greater than a threshold vacuum.

9. The method of claim 7, wherein the purging includes commanding open the canister vent valve and the canister purge valve.

10. A system for a vehicle, comprising:
an engine system, including an engine configured to propel the vehicle by combusting air and fuel;
a fuel system, including a fuel tank for storing the fuel;
an evaporative emissions system in fluidic communication with the fuel system and an intake of the engine via a purge line, the evaporative emissions system including a fuel vapor storage canister;
a canister heating element coupled to the fuel vapor storage canister;
a canister vent valve positioned in a vent line of the evaporative emissions system;
a canister purge valve positioned in the purge line; and
a controller storing instructions in non-transitory memory that, when executed, cause the controller to:
wake from a sleep mode and actuate the canister heating element a determined duration prior to an anticipated vehicle start a first time the vehicle is off, the determined duration based on ambient temperature, a size of the fuel vapor storage canister, and a load of the fuel vapor storage canister; and
remain in the sleep mode a second time the vehicle is off.

11. The system of claim 10, wherein, during the first time the vehicle is off, a driving route enabling purging of the fuel vapor storage canister is predicted and the load of the fuel vapor storage canister being greater than a threshold load is predicted subsequent to the anticipated vehicle start, and wherein, during the second time the vehicle is off, at least one of a driving route not enabling purging of the fuel vapor storage canister and the load of the fuel vapor storage canister being less than or equal to the threshold load is predicted subsequent to the anticipated vehicle start.

12. The system of claim 11, wherein the predicted driving route is learned based on data gathered while the vehicle is driven.

13. The system of claim 10, wherein the controller stores further instructions in non-transitory memory that, when executed, cause the controller to:
before transitioning to the sleep mode the first time the vehicle is off, set a timer to wake from the sleep mode and actuate the canister heating element at the determined duration.

14. The system of claim 10, wherein the controller stores further instructions in non-transitory memory that, when executed after waking from the sleep mode and actuating the canister heating element, cause the controller to:
command closed the canister vent valve;
maintain closed the canister purge valve; and
monitor a pressure of the evaporative emissions system.

15. The system of claim 14, wherein the instructions that cause the controller to monitor the pressure of the evaporative emissions system include further instructions stored in non-transitory memory that, when executed, cause the controller to:
indicate degradation of the evaporative emissions system responsive to the pressure of the evaporative emissions system not reaching a threshold pressure within the determined duration and a temperature of the fuel vapor storage canister reaching or surpassing a threshold temperature within the determined duration.

16. The system of claim 15, wherein the controller stores further instructions in non-transitory memory that, when executed, cause the controller to:
indicate degradation of the canister heating element responsive to the temperature of the fuel vapor storage canister not reaching or surpassing the threshold temperature within the determined duration.

17. The system of claim 14, wherein the controller stores further instructions in non-transitory memory that, when executed, cause the controller to:
after the anticipated vehicle start, purge fuel vapors from the evaporative emissions system to the intake of the engine responsive to purge conditions being met.

18. The system of claim 17, wherein the purge conditions include the vehicle being propelled by the engine and an amount of vacuum in the intake of the engine being greater than a threshold vacuum.

19. The system of claim 17, wherein the instructions that cause the controller to purge the fuel vapors from the evaporative emissions system to the intake of the engine include further instructions stored in non-transitory memory that, when executed, cause the controller to:

command open the canister vent valve and the canister purge valve.

* * * * *